United States Patent Office 3,509,140
Patented Apr. 28, 1970

3,509,140
HALOGENATED POLYCYCLIC SPIRO COMPOUNDS
Carleton W. Roberts, Midland, and Gale D. Travis, Shepherd, Mich., assignors to The Dow Chemical Company, Midland, Mich., a corporation of Delaware
No Drawing. Filed Dec. 27, 1966, Ser. No. 604,538
Int. Cl. C07d 87/28, 85/06
U.S. Cl. 260—244  9 Claims

ABSTRACT OF THE DISCLOSURE 1,1a,3,3a,4,5,5,5a,5b,6 - decahalooctahydrospiro[(1,3,4-metheno - 2H - cyclobuta(c,d)pentalene) - 2,2' - oxazolidin]-5'-one and related-oxazinidinone compounds which can be substituted on the 3',-4' and, in compounds in which it is possible, on the 5' position;

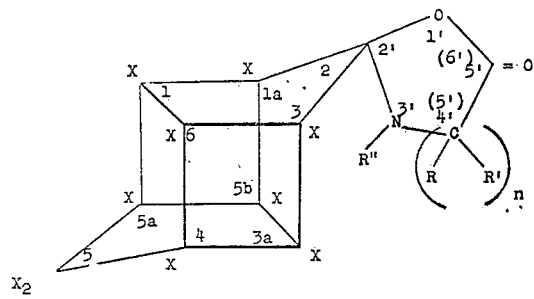

the compounds are strongly insecticidal but, at use concentrations, of very low toxicity to non-insect aquatic fauna.

BACKGROUND OF THE INVENTION

Acid catalyzed addition together of two molecules of hexahalocyclopentadiene (as opposed to a Diels-Alder reaction) followed by hydrolysis and hydration, gives 1,1a,3,3a,4,5,5,5a,5b,6 - decahalooctahydro - 1,3,4 - metheno-2H-cyclobuta(c,d)pentalene-2-one, the last named product as a hydrate. It is an article of commerce. It is attractive to examine what properties may pertain to derivatives obtained by reaction at the keto oxygen.

SUMMARY OF THE INVENTION

The present invention, of Carleton W. Roberts, 211 Sinclair Street, Midland, and Gale D. Travis, 204 N. Chippewa Street, Shepherd, both of Michigan, is concerned with organic chemistry and is particularly directed to polycyclic organic chemical ompounds one of the ycli nuclei of which is heterocyclic, the other, which can be regarded as more than one ring or nucleus, being alicyclic and heavily halogenated. More particularly, the present invention is directed to certain chemical compounds having 1,1a,3,3a,4,5,5,5a,5b,6-decahalooctahydrospiro[(1,3,4-metheno - 2H - cyclobuta(c,d)pentalene)2,2' - oxazolidin]- and oxazinidin-one structures that can be substituted. Among their many useful properties, the present compounds are strongly insecticidal but of low toxicity to desired aquatic fauna.

The nomenlature of the present substances is not distinguished by its simplicity. The compounds of the present invention will be more easily understood by reference to the formula

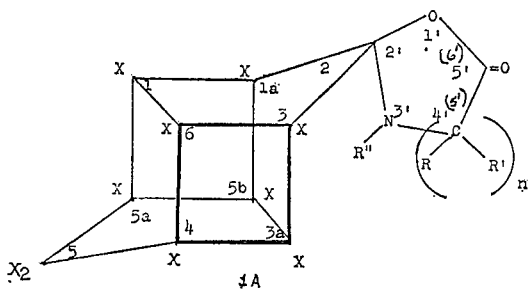

In this and succeeding formulae in the present specification and claims, X in each of its recurrences represents one of chlorine or bromine, the same throughout any one molecule: in the structural formula, the bonds shown in heavy lines and those in lighter lines have the same chemical value. The weight of the bonds is shown differing to diminish the sense of optical illusion.

Throughout the present specification and claims, R represents hydrogen, alkyl of from 1 to 6, both inclusive, carbon atoms, phenyl, benzyl, or substituted phenyl as hereinafter defined, or

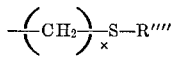

wherein R'''' is alkyl or alkenyl of one ethylenic double bond, said alkyl or alkenyl structure being of up to and including 6 carbon atoms and $x$ is an integer from 1 to 3, both inclusive; R' is independently of the samescope as R; and R'' is hydrogen, loweralkyl of from 1 to 4, both inclusive, carbon atoms; phenyl, benzyl, or substituted phenyl; an $n$ is an integer, 1 or 2. Uniformly, when the expression "substituted phenyl" is employed in the present specification and claims, it indicates a structure

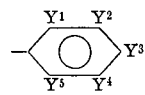

in which at least one of $Y^1$ and $Y^5$ is hydrogen; up to two of $Y^1$–$Y^5$ can be nitro; from one to four of the others of $Y^1$–$Y^5$ being selected from alkyl of from 1 to 6, both inclusive, carbon atoms, halo (fluoro, chloro, or bromo), phenyl, naphthyl, benzyl, loweralkoxy, loweralkylthio, loweralkylsulfinyl, loweralkylsulfonyl, phenylsulfinyl, phenylsulfonyl, lowerakylamino, diloweralkylamino; wherein loweralkyl and loweralkoxy, whether alone or in compound expressions, are used to designate said groups, respectively, being of from 1 to 4, both inclusive, carbon atoms. Also, when $n$ is 2, a group R on a first of $n$ carbon atoms, and a group R' on a second of $n$ carbon atoms, taken together, can comprise a divalent radical which, when taken together with the two said carbon atoms, constitutes a benzene ring.

The compounds of the present invention are, under ordinary conditions, crystalline solids, and they melt at temperatures substantially above the boiling temperature of water. In the crystalline form, when pure, they are typically colorless or, in mass. white. The compounds are highly insecticidal; they have very low to negligible toxicity to high life forms including, notably, water life. For this reason, the substances are adapted to be employed in the control of insects, such as mosquitoes, in water or in areas adjacent bodies of water of which the natural non-insect fauna is to be preserved.

The compounds of the present invention are prepared in various ways, the most direct beginning with the acid catalyzed condensation together of two molecules of hexahalocyclopentadiene in the presence of a strong dehydrating agent which can be fuming sulfuric acid or sulfur trioxide. The resulting condensed first intermediate product is then hydrolyzed to obtain, as second intermediate substance, 1,1a,3,3a,4,5,5,5a,5b,6-decahalooctahydro - 1,3,4 - metheno-2H-cyclobuta(c,d)pentalene-2-one. Synthesis of representative starting materials to this point is described, respectively, in U.S. Patents Reissues 24,750 and 24,749. However, the present specification neither ratifies nor challenges the patents as to structures of products there obtained.

By starting with hexachlorocyclopentadiene, one obtains the corresponding decachloropentaleneone compound; by starting with hexabromocyclopentadiene, one obtains the corresponding decabromopentaleneone compound. The chemistry of the starting reaction is illuminated by reference to U.S. Patent 3,212,973.

Upon preparation of the said intermediate pentaleneone, as a starting reactant in the present synthesis, it is, if necessary, purified. Also, the chlorinated said starting ketone is available as an article of commerce, although for further use in the synthesis of the present compounds it should usually first be purified and dehydrated.

The dehydrated and purified ketone is then combined with an alpha or beta amino acid under lactonizing conditions, and a condensation reaction occurs at the site of the keto oxygen whereby the amino acid is added, as a lactone structure, to the decahalooctahydromethenocyclobutapentaleneone nucleus, with preparation of the compounds of the present invention.

Alpha- and beta-amino acids of a wide range of identities are adapted to be employed in the reaction of the present invention. The only ones contraindicated are a few which, by reason of their own innate structures, would be expected to give rise to reactions other than the lactonizing reaction of the present synthesis. As the highly halogenated d e c a halooctahydromethenocyclopentaleneone structure is quite stable, few limitations pertain to the scope of the 5- or 6-membered heterocyclic lactone structure in the 2 position of the halogenated nucleus of the present compounds.

The compounds of structures in which the indicated 5- or 6-membered heterocycles occupy a position formerly occupied by chlorine or oxygen have been found to differ in many significant properties from the nearest such compounds hitherto known.

In purification and dehydration of the starting ketone, a desired portion of industrial purity product, which can be off-grade product, is refluxed over a water trap with thoroughly dried liquid reaction medium that is inert to the ketone and amino acid reactants under reaction conditions, boils as an azeotrope with water at a temperature of from about 80 to 160° C. but is substantially immiscible with water in the liquid phase. Such medium can be an aromatic solvent such as xylene. Boiling within the indicated temperature range can be controlled by control of imposed pressure, if desired. After extensive distillation which is preferably refluxing to dehydrate azeotropically, the resulting solution is decolorized with activated charcoal, filtered hot, and carefully distilled, with solvent recycled only after thorough removal of a separate water phase. After purification and dehydration, the cleaned product sample is inspected and, if not essentially water-clear, is again decolorized.

Thereafter, the ketone starting material is separated from solvent in conventional fashion, a first crop by cooling of solvent whereby crystals of purified starting material are thrown out of solution and separated by filtration whereupon they are washed and dried. From the remaining solvent absent the first crop of crystals, a further substantial portion of purified starting material is obtained by careful distillation whereby solvent is removed. In either event, the resulting crystals are washed with a small portion of chilled aromatic solvent such as further purified and dried xylene, and dried in a vacuum oven to obtain essentially solvent-free and water-free distilled and recrystallized 1,1a,3,3a,4,5,5,5a,5b,6-decachloro - octahydro-1,3,4-metheno-2H-cyclobuta(c,d)pentalene - 2 -' one. This material is then lactonized with any of a great variety of alpha-amino acids or beta-amino acids to obtain product of the present invention.

The lactonizing, as indicated, is carried out by the combining of the purified ketone with the amino acid of choice in the presence of a substantial excess of a liquid reaction medium, which can be a solvent, which forms an azeotrope with water, and under reflux, with water-removal recycle, maintaining the amino acid and the ketone in each others' presence at temperatures of from 80 to 160° C. for an interval of time such as from a few minutes to a day or two days to carry the reaction forward to a useful degree of completion.

The heat applied in carrying out the present reaction sometimes results in the formation of large, uncharacterized molecules of dark color.

Experience has shown that production of such discoloring molecules is heavily dependent upon the presence of oxygen in, or in contact with, the reaction mixture during reaction heating. Discoloration has been minimized, in the present specific embodiments, by nitrogen purge and nitrogen blanket, the nitrogen being first dried.

More particularly, via an inlet provided in the stopper of the flask neck, prior to reaction, dried nitrogen is passed through the reaction mixture for a period of time to urge and at least substantially remove oxygen from not only the reaction mixture substances, but also from the headspace above them in the flask. Then, during the reaction heating, nitrogen is passed into the mixture at the rate of about one to two bubbles per second, the exact rate not critical, to maintain a nitrogen blanket, excess being voided via the top of the reflux condenser. This procedure strongly minimizes discoloration, but does not completely prevent it.

If the resulting reaction mixture is undesiraby dark, it can be decolorized over activated charcoal. Various impurities including, if used, charcoal decolorizing agent, are removed by filtration, and the resulting filtrate chilled to precipitate portions of product as crystals. Such first crop of crystals is readily collected on a suction funnel such as a Büchner funnel and washed with small quantities of chilled aromatic solvent and thereafter dried in vacuum to obtain a first crop product.

Meantime, the chilled mother liquor from which the crystals were obtained can be distilled to obtain significant additional amounts of product. The resulting distilled product can, if desired, be further dispersed in hot aromatic solvent, further decolorized or dehydrated as may be needed, decolorizing or dehydrating agents removed by filtration, and the resulting product again separated by further crystallization and distillation.

The resulting product is again washed over vacuum filtration with small portions of chilled aromatic solvent and the crops of product combined. Conversion of starting material into product is nearly at the level of theoretical perfection. However, there is some loss in work-up. Yields over-all, based on starting ketone or amino acid or both, run in the range of from 70 to 95 percent, with yields between 80 and 90 percent being relatively typical of good laboratory practice. Lower yields, when obtained, represent insufficient reaction time or loss in purification and work-up.

Strong presumption of the resulting structure arises, upon the basis of the teachings of the present specification, from the identity of the starting ketone and amino acid, in view of the lactonization here set forth. However, structure is finally confirmed by elemental analysis, nuclear magnetic resonance, and infrared spectrum. The type reaction being established by instrumental analysis of various products, elemental analysis is sufficient to corroborate most structures.

Assuming satisfactory purity of starting materials, and ignoring minor side reactions, the reaction path leading to the products of the present invention, when $n$ is 1, and the halogen X is chlorine, can be represented as follows:

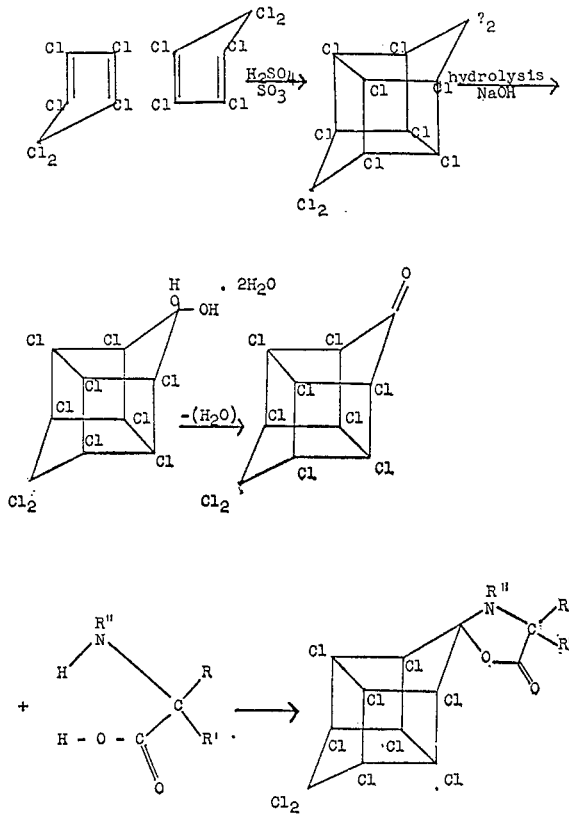

The character $?_2$ at the right of the formula for the first reaction product is intended to represent uncertainty as to the exact identity of the intermediate material depicted. The two moieties may be sulfonyl and hydrogen, or otherwise.

It is thus apparent that any substituents on the heterocyclic ring of the products of the present invention are previously substituents on the amino acid reactant. By choice of amino acid, and with especial reference to substituents on the $\alpha$ carbon atom or, when present, the $\beta$ carbon atom, and on the nitrogen, as designated R, R', and R" above, it is convenient to prepare any compound of the present invention.

The products of the present invention are readily prepared in procedures of which the best present representatives are exemplified as follows:

EXAMPLE 1

Preperation of 1,1a,3,3a,4,5,5,5a,5b,6 - decachlorooctahydrospiro[(1,3,4-metheno - 2H-cyclobuta(c,d)pentalene-2,2'oxazolidin]-5'one Into a one-liter, single-necked, round-bottomed flask, equipped with a Dean-Stark trap, nitrogen inlet, and a heating mantle and magnetic stirrer bar, were placed 50.8 grams (0.10 mole based on 1 mole of water of hydration) of recrystallized 1,1a,3,3a,4,5,5,5a,5b,6-decachloroctahydro-1,3,4-metheno - 2H - cyclobuta(c,d)pentalene-2-one together with 500 milliliters m-xylene as solvent. To the resulting mixture was added 7.51 grams (0.10 mole) of glycine and the reaction mixture nitrogen purged and, under nitrogen blanket, heated to its reflux tempera-
ture, about 135–140° C. Condensed portions of solvent were continuously recycled through the water trap for 24 hours. Thereafter, heating was discontinued and the reaction mixture permitted to cool to room temperature, whereupon solvent was vaporized and removed. The residue was picked up in and recrystallized from toluene to obtain 45 grams (a yield of 78) of 1,1a,3,3a,4,5,5,5a,5b,6 - decachlorooctahydrospiro[(1,3,4 - metheno - 2H-cyclobuta(c,d)pentalene)-2,2' oxazolidin]-5'one product. The compound melted with decomposition at 270° C. Upon analysis, the product was found to contain 27.9 percent carbon, 0.61 percent hydrogen, 62.3 percent chlorine, and 2.76 percent nitrogen as compared with theoretical values of, respectively, 26.31, 0.55, 64.16 and 2.56.

EXAMPLE 2

Preparation of 1,1a,3,3a,4,5,5,5a,5b,6-decachlorooctahydro - 4' - methyl-spiro[(1,3,4-metheno-2H-cyclobuta(c,d)pentalene)-2,2'-oxazolidin]-5'-one In a one-liter, single-necked, round-bottomed flask equipped with a reflux condenser and trap for condensation of solvent and removal of water, and a heating mantle, was placed 50.87 grams (0.10 mole) of 1,1a,3a,4,5,5,5a,5b,6-decachlorooctahydro - 1,3,4 - metheno-2H-cyclobuta(c,d)pentalene-2-one and 500 milliliters of m-xylene as solvent. To the resulting mixture was then added 8.91 grams (0.10 mole) of D,L-alanine with 50 milliliters of fresh m-xylene. The resulting reaction mixture was nitrogen purged and blanketed, and heated to its reflux temperature, and maintained under reflux for 24 hours, condensing portions of solvent being returned to the reaction vessel through the water trap whereby water of reaction was continuously removed as an azeotrope. At the end of 24 hours reaction time, the resulting reaction mixture was cooled and only enough solvent vaporized and removed to obtain a semi-solid resdue. This residue was recrystallized from toluene to obtain 53 grams (71% yield) of 1,1a,3,3a,4,5,5,5a,5b,6-decachlorooctahydro-4'-methyl-spiro[(1,3,4 - metheno-2H-cyclobuta (c,d)pentalene)-2,2'-oxazolidin]-5'-one product melting at 195–196° C. The resulting product was analyzed and found to contain 27.8 percent carbon, 1.08 percent hydrogen, 63.0 percent chlorine, and 2.39 percent nitrogen as compared with theoretical values of 27.80 percent, 0.90 percent, 63.12 percent, and 2.49 percent respectively.

EXAMPLE 3

Preparation of 1,1a,3,3a,4,5,5,5a,5b,6-decachlorooctahydro - 4' - isopropyl-spiro[(1,3,4-metheno-2H-cyclobuta(c,d)pentalene)-2,2'-oxazolidin-5'-one In to a two-liter, single-necked, round-bottomed flask equipped with heating mantle, magnetic stirrer, reflux condenser and water trap was placed 254 grams (0.50 mole assuming one water of hydration) of 1,1a,3,3a,4,5, 5,5a,5b,6-decachlorooctahydro-1,3,4-metheno - 2H - cyclobuta(c,d)pentalene-2-one together with 1400 milliters m-xylene. The resulting reaction mixture was nitrogen purged and blanketed, and heated to reflux, solvent was recycled for ½ hour with removal of any water thereby separated, the resulting purified mixture was cooled slightly and thereto were added 58.5 grams (0.50 mole) of D,L-valine. The resulting reaction mixture was again heated to its reflux temperature, and solvent permitted to recycle until the water trip showed no further collection of water, approximately 48 hours.

Had the resulting reaction mixture been discolored, activated charcoal could have been added at this juncture to decolorize the resulting product. It was not necessary in the synthesis described in this example.

The hot reaction mixture was then chilled in an ice bath, until formation of crystals appeared to be complete. The crystals were then collected to a Büchner funnel, and washed with small quantities of chilled m-xylene, transferred to a drying dish, and dried in a vacuum oven at 45° C. for 24 hours. A yield of 207 grams (70%) crude product was thus obtained. The mother liquor from which the crystals were thrown out was then vacuum distilled to obtain 53 grams further, a total yield of crude product representing 88% of theoretical.

The two crops of crystals were combined, and dissolved in a minimum amount of refluxing toluene. A 10 percent excess of solvent was then added, and the solution filtered hot. The filtrate was allowed to cool to room temperature, and then chilled in an ice bath. White crystals formed and were collected on a Büchner funnel, transferred to a drying dish, and dried in a vacuum oven at 45° C. for 24 hours to give a first recrystallized crop of 208 grams (70% yield). Evaporation of toluene from the filtrate yielded an additional 50 grams of nearly pure material for a total recrystallized yield of 87 percent.

The recrystallized and purified 1,1a,3,3a,4,5,5,5a,5b,6-decachlorooctahydro - 4' - isopropyl-spiro[(1,3,4-metheno-2H-cyclobuta(c,d)pentalene) - 2,2' - oxazolidin]-5'-one product was found to melt at 186–187° C. The assigned structure was confirmed jointly by infrared spectrum and nuclear magnetic resonance. The compound was analyzed for certain elements and found to contain 30.6 percent carbon, 1.7 percent hydrogen, 60.1 percent chlorine and 2.34 percent nitrogen as compared with the oretical values of 30.5, 1.5, 60.2, and 2.4 percent respectively. Molecular weight was checked by vapor pressure method and a value of 603, 1.6 percent higher than theoretical, was ascertained.

EXAMPLE 4

Preparation of 1,1a,3,3a,4,5,5,5a,5b,6-decachlorooctahydro - 4' - isopropyl-spiro[(1,3,4-metheno-2H-cyclobuta(c,d)pentalene)-2,2'-oxazolidin]-5'-one Into a one-liter, single-necked round-bottomed flask, equipped with reflux condenser, Dean-Stark water trap, inlet for gaseous nitrogen, heating mantle, magnetic stirrer with polytetrafluoroethylene coated stirring bar, was placed 127 grams (0.25 mole, assuming 1 water of hydration) of 1,1a,3,3a,4,5,5,5a,5b,6 - decachorooctahydro-1,3,-metheno - 2H - cyclobuta(c,d)pentalene-2-one which had previously been purified by recrystallizing. Enough m-xylene was added completely to dissolve the ketone at reflux temperature, and 32.8 grams (0.25 mole) of D,L-leucine was added and the resulting solution nitrogen purged and blanketed, and heated to the boiling temperature, and maintained at reflux for a period of 24 hours with the return condensate passing through a trap whereby water carried over in the vapor phase as an azeotrope was removed before the solvent was returned to the reaction mixture.

Thereupon, the resulting mixture was permitted to cool to room temperature, solvent was vaporized and removed, and it was ascertained that there were 110 grams (70% yield) of recovered solid. The crude solid was recrystallized from toluene to obtain 80 grams (53%) of purified 1,1a,3,3a,4,5,5,5a,5b,6-decachlorooctahydro-4'-isobutyl-spiro[(1,3,4-metheno - 2H - cyclobuta(c,d)pentalene)-2,2'-oxazolidin]-5'-one product melting at the temperature of 204–205° C. The product was identified by in frared spectrum and was analyzed and found to have contents of carbon of 32.05, of hydrogen 1.86, of chlorine 58.20 and nitrogen 2.19 percent by weight of total compound as compared with theoretical values of 31.82, 1.84, 58.72, and 2.32 percent respectively.

EXAMPLE 5

Preparation of 1,1a,3,3a,4,5,5,5a,5b,6-decachlorooctahydro - 4' - secondary butylspiro[(1,3,4 - metheno - 2H-cyclobuta(c,d)pentalene)-2,2'-oxazolidin]-5'-one In equipment essentially the same as that described in the examples foregoing, namely a one-liter single-neck, round-bottom flask with reflux condenser, water trap, heating mantle and stirring means, was placed 50.87 grams (0.10 mole) of 1,1a,3,3a,4,5,5,5a,5b,6-decachlorooctahydro-1,3,4-metheno-2H-cyclobuta(c,d)pentalene-2-one and 500 milliliters of m-xylene as solvent. The resulting slurry was nitrogen purged and blanketed and heated to the boiling temperature and maintained thereat under reflux with stirring, and the solvent returned by way of a water trap whereby water brought over in the vapor phase as an azeotrope was removed and the xylene returned to the reaction mixture. Such heating was continued for 8 hours to purify the starting material and remove water from the reaction mixture. At the conclusion of 8 hours, 13.1 grams (0.10 mole) of D,L-isoleucine was added and the reflux boiling, water trapping, and return of solvent to the reaction vessel was continued for 8 hours. At the end of this time, the resulting solution was filtered hot and the filtrate heated to vaporize and remove solvent to the point that the resulting product was in the form of a wet paste. The product was taken up in and recrystallized from toluene to obtain 36 grams (a 60% yield) of product. The 1,1a,3,3a,4,5,5,5a,5b,6 - decachlorooctahydro - 4' - secondarybutylspiro[(1,3,4 - metheno-2H-cyclobuta (c,d)pentalene)-2,2'-oxazolidin]-5-'-one product was identified by infrared spectrum and found to have a melting temperature of 158–159° C. Upon analysis, the compound was found to have contents of carbon of 32.2, of hydrogen of 1.72, of chlorine of 58.7, and nitrogen 2.28 percent by weight of compound, respectively, as compared with theoretical values of 31.8, 1.84, 58.7, and 2.38 respectively, all based upon a molecular weight of 603.84.

The essentially identical preparation employing the same starting materials, equipment, and operating conditions was repeated and upon completion a 70% yield of the same product based on starting materials was obtained.

EXAMPLE 6

Preparation of 1,1a,3,3a,4,5,5,5a,5b,6-decachlorooctahydro-4'-(2-(methylthio)ethyl)-spiro((1,3,4-metheno-2H-cyclobuta(c,d)pentalene)-2,2'-oxazolidin)-5'-one The reaction of the present synthesis was carried out in a one-liter, single-necked, round-bottomed flask equipped with reflux condenser provided with Dean-Stark trap for removal of water, nitrogen inlet, heating mantle and magnetic stirrer and bar. Into the flask was placed 127 grams (0.25 mole based upon the assumption that the compound carried 1 molecule of water of hydration per molecule of starting material) of purified 1,1a,3,3a,4,5,5,5a,5b,6-decachloro-octahydro - 1,3,4 - metheno-2H-cyclobuta(c,d)pentalene-2-one together with 500 milliliters of m-xylene. Also, 37.3 grams (0.25 mole) of D.L-methionine was added to the xylene dispersion of starting materials. The resulting reaction mixture was nitrogen purged and blanketed, and heated to the boiling temperature and maintained thereat under reflux and with systematic removal of condensed water originally brought over as an azeotrope, and with systematic return of the xylene to the reaction mixture. This reflux condition was maintained for 3.5 hours. At the end of the indicated reaction time, the methionine, previously visible as a separate solid in the reaction mixture, had largely disappeared, dissolving in the reaction mixture with reaction. Moreover, the reaction mixture had begun to darken rapidly. Heating was thereafter discontinued, and the mixture permitted to cool to room temperature and thereafter chilled over ice whereupon a first crude precipitate of 56 grams (38%) of product was obtained. The crude product was taken up in and recrystallized from toluene to obtain 36 grams (24% yield) of recrystallized 1,1a,3,3a,4,5,5,5a,5b,6-decachlorooctahydro - 4' - (2 - (methylthio)ethyl) - spiro((1,3,4-metheno - 2H - cyclobuta(c,d)pentalene) - 2,2' - oxazolidin)-5'-one product melting at 155–157° C. The product was characterized by infrared spectrum, and analyzed and found to contain 29.1 percent carbon, 1.60 percent hydrogen, 57.0 percent chlorine, 5.01 percent sulfur and 2.16 percent nitrogen, as compared with theoretical values (based on the molecular weight of 621.88) of 28.97, 1.46, 57.02, 5.16 and 2.25 percent respectively, all percents by weight of total compound.

EXAMPLE 7

Preparation of 1,1a,3,3a,4,5,5,5a,5b,6-decachloro-octahydro-4'-benzyl-spiro[(1,3,4 - metheno - 2H - cyclobuta-(c,d)pentalene)-2,2'-oxazolidin]-5'-one In the present example, the equipment and reaction solvent were essentially the same as those employed hitherto. The charge into the one-liter, single-necked, round-bottomed flask under reflux apparatus provided with a Dean-Stark water trap and a heating mantle was 50.87 grams (0.10 mole) of 1,1a,3,3a,4,5,5,5a,5b,6 - decachloro-octahydro-1,3,4-metheno-2H-cyclobuta(c,d)pentalene - 2-one together with 500 milliliters purified m-xylene. The mixture was further purified of water by heating to the reflux temperature with stirring and maintaining thereat in conjunction with the Dean-Stark water trap whereby azeotropic water was condensed and removed and the xylene solvent returned to the reaction mixture. At the conclusion of 24 hours azeotropic drying of the solvent and first reactant, there was then added 16.5 grams (0.10 mole) of D,L-phenylalanine and recycling under reflux and under nitrogen blanket was continued for 24 hours. At the end of this time, the resulting hot solution was filtered and the filtrate vaporized to remove solvent to the point of near dryness. The 30 grams of crude product as a paste was taken up in and recrystallized from toluene to obtain 20 grams (32% yield) of purified 1,1a,3,3a,4, 5,5,5a,5b,6 - decachlorooctahydro-4'-benzyl - spiro[(1,3,4 - metheno - 2H - cyclobuta(c,d)pentalene) - 2,2'-oxazolidin]-5'-one product, melting at 171–173° C.

It is noted that no major effort was put forth to obtain highest possible yields, the interest at this point being, rather, in obtaining a relatively pure product for characterization. If maximum yield from starting material is desired, more economical purification methods than those here employed can be used.

The product of the present example was analyzed upon the basis of a molecular weight of 637.85, and found to have contents of carbon, hydrogen, chlorine, and nitrogen, of 35.8, 1.42, 55.53, and 2.20 percent by weight of compound respectively, as compared with theoretical values of 35.78, 1.42, 55.59, and 2.19 percent respectively.

EXAMPLE 8

Procedurally, the present example was essentially the same as those foregoing except that it was carried out on a smaller scale. The single-necked, round-bottomed flask was of 500 milliliters capacity, equipped with reflux condenser which had been provided with a Dean-Stark water trap, heating mantle, inlet for nitrogen gas, and magnetic stirring means. Into the flask was placed 7.1 grams (0.014 mole based on the assumption of 1 water of hydration) of recrystallized 1,1a,3,3a,4,5,5a,5b,6-decachlorooctahydro-1,3,4-metheno - 2H - cyclobuta(c,d)pentalene-2-one and 120 milliliters of m-xylene as solvent. To the resulting mixture was added 2.5 grams (0.014 mole) of m-fluorophenylalanine. The reaction mixture was thereupon nitrogen purged and blanketed, and heated to the boiling temperature and maintained under reflux, with recycle of solvent with systematic removal of azeotropic water for a period of 5.75 hours. At the end of this time, the resulting liquid was filtered hot, the filtrate heated to vaporize and remove most of the solvent, to obtain a soft residue which was thereupon taken up in toluene which was boiling under reflux. The resulting 1,1a,3,3a,4,5,5a,5b,6-decachloro - 4' - (m-fluorobenzyl)-octahydrospiro[(1,3,4-metheno - 2H - cyclobuta(c,d)pentalene)-2,2'-oxazolidin]-5'-one product was treated with activated charcoal and filtered hot to remove miscellaneous impurities, and again, from the filtrate, solvent was largely removed by vaporization. The resulting product was then again taken up in a mixture of dichloromethane and heptane and recrystallized therefrom. Thereafter, the product was again recrystallized from heptane to obtain three grams (32.6%) of product, melting at a temperature of 160–161° C., softening perceptibly at a temperature as low as 151° C. Upon the assumption of a molecular weight of 655.85, the product was analyzed for carbon, hydrogen, fluorine, chlorine and nitrogen and found to have a composition, expressed as percent element by weight of total compound, of 33.3, 1.28, 2.78, 54.45 and 2.23 respectively, as compared with theoretical values of 34.8, 1.23, 2.90, 54.06 and 2.13.

EXAMPLE 9

When the heterocyclic moiety of the present invention is to be an oxazinidinone, the amino acid to be lactonized is a β-amino acid rather than an α-amino acid. Although the α-amino acids and the β-amino acids are not expected to behave alike on even simple chemical grounds in many situations, the lactonizing to combine with the starting ketone of the present process goes forward under conditions and in equipment essentially the same as are applicable for the lactonizing of the α-amino acids.

Preparation of 1,1a,3,3a,4,5,5,5a,5b,6-decachlorooctahydro-spiro[(1,3,4-methano( - 2H - cyclobuta(c,d)pentalene)-2,2'-2H-3,1-benzoxazin)]-4'(1'H)-one Into a one-liter, single-necked, round-bottomed flask equipped with a reflux condenser provided with a Dean-Stark trap, nitrogen inlet, heating mantle and magnetic stirrer and bar, was placed 50.8 grams (0.10 mole based on 1 water of hydration) of recrystallized 1,1a,3,3a,4,5, 5,5a,5b,6 - decachlorooctahydro-1,3,4-metheno-2H-cyclobuta(c,d)pentalene-2-one together with 300 millilters m-xylene as solvent. To the resulting mixture was added 13.7 grams (0.10 mole) of recrystallized anthranilic acid and the reaction mixture nitrogen purged and blanketed, and thereafter heated to the boiling temperature and maintained thereat for 24 hours, under reflux and with trapping and removal of water. At the end of 24 hours reaction time, the resulting mixture was cooled to room temperature, heated to remove solvent and obtain a product residue, the residue was taken up in and recrystallized from toluene to give 40 grams (67% yield) of 1,1a,3,3a,-4,5,5,5a,5b,6-decachlorooctahydro - spiro[(1,3,4-metheno ( - 2H - cyclobuta(c,d)pentalene)-2,2'-2H-3,1-benzoxazin)]-4'(1'H)-one product, melting at 286–287° C. The compound was analyzed for contents of carbon, hydrogen, chlorine and nitrogen and found to contain 33.3, 0.59, 58.15 and 2.40 percent by weight of compound respectively, which may be compared with theoretical values of 33.48, 0.83, 58.13 and 2.30, respectively.

The procedures and products of the examples, foregin, are representative of a portion of this invention. Also illustrative of the invention, various other products are readily prepared in procedures that do not differ significantly from those foregoing. By the reaction of 1,1a,3,3a,4,5,5,5a,5b,6 - decabromooctahydro-1,3,4-metheno-2H-cyclobuta(c,d)pentalene-2-one and 2,2,3-trimethyl-3-methylaminobutyric acid, one obtains a 1,1a,3,3a,4, 5,5,5a,5b,6-decabromododecahydro - 3',4',4',5',5', - pentamethyl-spiro((1,3,4-metheno - 2H - cyclobuta(c,d)pentalene)-2,2'-(2H-1,3-oxazin))-6'-one product.

Similarly, from the cyclizing of 2-hexylglycine with 1,1a,3,3a,4,5,5,5a,5b,6-decachlorooctahydro - 1,3,4 - metheno-2H-cyclobuta(c,d)pentalene-2-one, there is obtained a 1,1a,3,3a,4,5,5,5a,5b,6-decachloro - 4' - hexyloctahydrospiro((1,3,4 - metheno - 2H - cyclobuta(c,d)pentalene)-2,2'-oxazolidin)-5'-one product.

Also, and with no greater difficulty, the reaction of 1,1a,3,3a,4,5,5,5a,5b,6-decachlorooctahydro - 1,3,4 - metheno-2H-cyclobuta(c,d)pentalene-2-one and 2 - phenylglycine, the latter being cyclized, yields a 1,1a,3,3a,4,5,5,5a, 5b,6-decachlorooctahydro - 4' - phenyl-spiro((1,3,4-metheno-2H-cyclobuta(c,d)pentalene - 2,2′ - oxazolidin))-5′-one product.

Likewise, employing the same general reaction and procedure, but starting with 1,1a,3,3a,4,5,5,5a,5b,6-decabromooctahydro - 1,3,4 - metheno-2H-cyclobuta(c,d)pentalene-2-one and N-phenylglycine (melting at 123°–125° C.) one obtains 1,1a,3,3a,4,5,5,5a,5b,6-decabromooctahydro-3′-phenyl-spiro((1,3,4-metheno - 2H - cyclobuta(c,d)pentalene)-2,2′-oxazolidin)-5′-one.

Following an essentially parallel reaction path, employing 1,1a,3,3a,4,5,5,5a,5b,6-decachlorooctahydro-1,3,4-metheno-2H-cyclobuta(c,d)pentalene-2-one in cyclizing reaction with 2-tolylglycine (mixed isomers as to the tolyl group) there is produced a 1,1a,3,3a,4,5,5,5a,5b,6-decachlorooctahydro - 4′ - tolylspiro((1,3,4-metheno-2H-cyclobuta(c,d)-pentalene)-2,2′-oxazolidin)-5′-one product in which the distribution of tolyl isomers is essentially the same as in the starting amino acid.

When reacting N,2-bis(dinitrophenyl)glycine and 1,1a,3,3a,4,5,5,5a,5b,6 - decachlorooctahydro - 1,3,4-metheno-2H-cyclobuta(c,d)pentalene-2-one, it is desirable to employ lower reaction temperatures and maintain the reaction mixture thereat for a longer period of reaction time, to obtain, in good yield, a 1,1a,3,3a,4,5,5,5a,5b,6-decachloro - 3′,4′ - bis(dinitrophenyl)octahydrospiro((1,3,4-metheno - 2H-cyclobuta(c,d)pentalene)-2,2′-oxazolidin)-5′-one product.

The reaction also, cyclizing 2-((1-naphthyl)phenyl)-glycine with 1,1a,3,3a,4,5,5,5a,5b,6-decachlorooctahydro-1,3,4 - metheno-2H-cyclobuta(c,d)pentalene-2-one, readily produces a 1,1a,3,3a,4,5,5,5a,5b,6-decachlorooctahydro-4′-((1 - naphthyl)phenyl) - spiro((1,3,4-metheno-2H-cyclobuta(c,d)pentalene)-2,2′-oxazolidin)-5′-one product.

When the amino acid that is cyclized is 2-(p-(ethylthio)phenyl)glycine, with 1,1a,3,3a,4,5,5,5a,5b,6-decachloro-octahydro - 1,3,4 - metheno-2H-cyclobuta(c,d)pentalene-2 - one, the 1,1a,3,3a,4,5,5,5a,5b,6 - decachloro - 4′-(p-(ethylthio)phenyl)octahydrospiro((1,3,4 - metheno - 2H-cyclobuta(c,d)pentalene)-2,2′-oxazolidin)-5′-one product is obtained in good yield.

From the reaction of 2-(p-(tert.-butylsulfinyl)phenyl glycine and 1,1a,3,3a,4,5,5,5a,5b,6-decachlorooctahydro-1,3,4-metheno-2H-cyclobuta(c,d)pentalene-2-one, there is obtained a 4′-(p-(tert.-butylsulfinyl)phenyl)-1,1a,3,3a,4,5,5,5a,5b,6 - decachlorooctahydrospiro((1,3,4 - metheno-2H - cyclobuta(c,d)pentalene) - 2,2′-oxazolidin)-5′-one product.

From 2 - (m - (methylsulfonyl)phenyl)glycine cyclized upon 1,1a,3,3a,4,5,5,5a,5b,6 - decachlorooctahydro-1,3,4-metheno-2H-cyclobuta(c,d)pentalene-2-one, the product is 1,1a,3,3a,4,5,5,5a,5b,6 - decachlorooctahydro - 4′ - (m-(methylsulfonyl)phenyl)spiro((1,3,4 - metheno - 2H-cyclobuta(c,d,)pentalene)-2,2′-oxazolidin)-5′-one.

From N(p(phenylsulfinyl)phenyl)glycine and 1,1a,3,3a,4,5,5,5a,5b,6 - decachlorooctahydro - 1,3,4 - metheno-2H-cyclobuta(c,d)pentalene-2-one, a 1,1a,3,3a,4,5,5,5a,5b,6 - decachlorooctahydro - 3′-(p-(phenylsulfinyl)phenyl)-spiro((1,3,4 - metheno - 2H - cyclobuta(c,d)pentalene)-2,2′-oxazolidin)-5′-one product is obtained.

Also, from (o-acetamidoanilino)(diethylamino)acetic acid and 1,1a,3,3a,4,5,5,5a,5b,6 - decachlorooctahydro-1,3,4-metheno-2H-cyclobuta(c,d)pentalene-2-one, a 3′-(o-acetamidophenyl) - 1,1a,3,3a,4,5,5,5a,5b,6 - decachloro-4′-(diethylamino)octahydrospiro((1,3,4 - metheno - 2H-cyclobuta(c,d)pentalene)-2,2′-oxazolidin)-5′-one product is obtained.

Many of the starting amino acids are articles of commerce. Some of those here illustrated, and some others used in preparing products embraced within the present genus, are synthesized to order. Available procedures are well known and are set forth in the literature at, for example, 10 Ann. Rev. Biochem 91 and following (1941), by Dunn; "Organic Chemistry" by Gilman, (John Wiley's Sons, N.Y., 1943) vol. 2, Clarke's contribution at p. 1079 and following; also "Amino Acids and Proteins (Reinhold, N.Y,. 1944) by Sahyun, the Carter and Hopper contribution, p. 94 and following; also Dunn's article in Schmidt's "Amino Acids and Proteins," 2nd ed., (Charles C. Thomas, Springfield, Ill., 1944) p. 21 and following. Other syntheses are to be found in such standard works as Beilsteins "Handbook," Kirk & Othmer, "Encyclopedia" and elsewhere.

Preferred reaction media are those employed in the examples, foregoing; however, any reaction medium can be used subject to the following criteria: it must be a liquid that boils and, in the presence of water forms an azeotropic vapor in the temperature range of about 80 to about 160° C. Small departures from these values will occur as a result of the presence of varying amounts of solute present. The medium must be unreactive, or at the most only very slowly reactive, under employed conditions, with any of the intended reactants of the present synthesis. As its water azeotrope vapor condenses, the reaction medium should preferably separate from the water, at least in major part, leaving an essentially organic and an essentially aqueous phase susceptible of gravity separation.

Among the reaction media meeting those criteria, all but the last of which are critical to the present invention, preference will be noted on grounds not critical to the invention, on the basis of safety and convenience of working with a given medium, coat, odor, and the like. These may be left to the skilled chemist.

Reaction media that are adapted to be used in the present synthesis include, but are by no means limited to, nitromethane, trichloroethylene, pentachloroethylene, dioxane, tert.-butyl alcohol, cyclopentanol, ethyl propionate, methyl butyrate, propyl acetate, 2-methoxyethyl acetate, tert.-amyl alcohol, 1,2-dimethoxy propane, 1,1,2-trimethoxyethane, chlorobenzene, nitro-benzene, benzene, toluene, anisole, heptane, and xylene.

If desired, other reaction media can easily be chosen by reference to published data, such as "Azeotropic Data" (American Chemical Society, 1952) by Horsley et al.; note particularly the data on pages 6–12, which sets forth properties of water azeotropes.

The compounds of the present invention are useful as insecticides, particularly for control of water-dwelling insects in the presence of desired other aquatic fauna. For various uses, the unmodified compounds may be employed. Alternatively, the compounds may be dispersed on an inert finely divided solid and the resulting preparation employed as a dust. Also, such preparations may be dispersed in water such as a body of water to be treated, with or without the aid of a wetting agent. At suitable concentrations the resulting aqueous suspensions are employed as sprays. In other procedures, the compounds may be employed in organic solvent or as a constituent of solvent-in-water or water-in-solvent emulsions or as aqueous dispersions thereof which may be applied as spray. Suitable solvents include those set forth hereinbefore as reaction media for preparation or those used as recrystallization solvents.

In a representative operation, a body of natural water, modified to contain, as a uniform dispersion, two parts of the product of present Example 2 per million parts by weight of total aqueous preparation was employed as aqueous environment of third and fourth instar larvae of *Aedes aegyptii*, a mosquito vector of yellow fever; a known population of such larvae was maintained in a confined area of said medium for 24 hours and thereafter examined. It was ascertained that all the said larvae were dead. In contrast, identical exposure of a known population of *Daphnia longispina* (a crustacean) and of Ram's Horn Snail (a mollusc) was without effect upon the two latter populations.

We claim:

1. Compound of claim 1 which is 1,1a,3,3a,4,5,5,5a,5b,6-decachlorooctahydrospiro[(1,3,4 - metheno-2H-cyclobuta(c,d)pentalene)-2,2′-oxazolidin]-5′-one.

2. Compound of claim 1 which is 1,1a,3,3a,4,5,5,5a,5b,6-decachlorooctahydro-4'-methyl-spiro[(1,3,4 - metheno-2H-cyclobuta(c,d)pentalene) - 2,2' - oxazolidin]-5'-one.

3. Compound of claim 1 which is 1,1a,3,3a,4,5,5,5a,5b,6-decachlorooctahydro - 4' - isopropyl-spiro[(1,3,4-metheno-2H-cyclobuta(c,d)pentalene)-2,2' - oxazolidin]-5'-one.

4. Compound of claim 1 which is 1, 1a,3,3a,4,5,5,5a,5b,6-decachlorooctahydro - 4'-isobutyl-spiro[(1,3,4-metheno-2H-cyclobuta(c,d)pentalene) - 2,2' - oxazolidin]-5'-one.

5. Compound of claim 1 which is 1,1a,3,3a,4,5,5,5a,5b,6-decachlorooctahydro-4' secondary butylspiro[(3,4-metheno-2H-cyclobuta(c,d)pentalene) - 2,2'-oxazolidin]-5'-one.

6. Compound of claim 1 which is 1,1a,3,3a,4,5,5,5a,5b,6-decachlorooctahydro-4' - (2 - (methylthio)ethyl)-spiro((1,3,4-metheno - 2H - cyclobuta(c,d)pentalene)-2,2'-oxazolidin)-5'-one.

7. Compound of claim 1 which is 1,1a,3,3a,4,5,5,5a,5b,6-decachloro-octahydro-4' - benzyl-spiro[(1,3,4-metheno-2H-cyclobuta(c,d)pentalene) - 2,2' - oxazolidin]-5'-one.

8. Compound of claim 1 which is 1,1a,3,3a,4,5,5,5a,5b,6-decachaloro-4' - (m - fluorobenzyl)-octahydrospiro[(1,3,4-metheno - 2H - cyclobuta(c,d)pentalene)2,2'-oxazolidin]-5'-one.

9. Compound of claim 1 which is 1,1a,3,3a,4,5,5,5a,5b,6-decachlorooctahydro-spiro[(1,3,4 - metheno(2H-cyclobuta(c,d)pentalene) - 2,2'-2H-3,1 - benzoxazin)]-4'-(1'H)one.

References Cited

UNITED STATES PATENTS 2,911,414   11/1959   Simmons _____ 260—307.1
2,960,433   11/1960   Eden _____ 260—244

OTHER REFERENCES

Farah et al., Jour. Chem. Eng. Data, vol. 11, pp. 409–12 (1966, July).
Griffin et al., Chem. Abst. vol. 61, col. 15956 (1954).
Dane et al., Angew. Chem. vol. 71, p. 339 (1959).

HENRY R. JILES, Primary Examiner

N. TROUSOF, Assistant Examiner

U.S. Cl. X.R.

260—307, 586, 617, 999